Patented July 14, 1925.

1,546,289

UNITED STATES PATENT OFFICE.

HENRY I. LEA, OF SANTA MONICA, AND CLIFFORD W. HUMPHREY, OF BURLINGAME, CALIFORNIA.

ALUMINUM CHLORIDE PROCESS.

No Drawing.   Application filed June 20, 1923.   Serial No. 646,558.

*To all whom it may concern:*

Be it known that we, HENRY I. LEA and CLIFFORD W. HUMPHREY, citizens of the United States, residing in Santa Monica, county of Los Angeles, State of California, and Burlingame, county of San Mateo, State of California, respectively, have jointly invented new and useful Improvements in Aluminum Chloride Processes, of which the following is a specification.

This invention relates to processes for the production principally of aluminum chloride. The present general object of the invention concerned in this application and in several copending and companion applications, hereinafter identified, is the economical production of anhydrous aluminum chloride (hereinafter referred to simply as aluminum chloride); but the process as hereinafter described also produces other products of some value. Consequently, although aluminum chloride is at present the most valuable product of the process, and although for that reason we term our process one for producing aluminum chloride, it is not to be understood that it may not be an object, or perhaps under other conditions the principal object, to produce one or more of the other products of the process.

This present application, like several companion applications filed on even date herewith, is in part a divisional continuation of our application entitled Aluminum chloride process, Ser. No. 564,762, filed May 31, 1922. In that application we have described several variational forms for the production of aluminum chloride from aluminum sulphate or an aluminum sulphate ore. The various process forms described in said application have been divided between several applications, of which the present application is one; the original application being identified in this series as application "A", this present application being identified as application "E". The subject matters of the remaining companion applications, filed on even date herewith, relate mainly to processes wherein aluminum sulphate, or aluminum sulphate carrying ore, is dehydrated and decomposed to separate aluminum oxide from the sulphur and oxygen content; and then the sulphur oxygen content is characteristically used for the purpose of producing a chlorinating agent (hydrochloric acid or chlorine) to be used to chlorinate the aluminum oxide produced. Or, as explained in application "D" Serial No. 646,557, filed June 20, 1923, of this series, a part or all of the sulphur and oxygen content may be used for the purpose of producing more sulphate or oxide for the process.

On the other hand, this present application deals with that specific form of process wherein the aluminum sulphate, or aluminum sulphate carrying ore, is treated directly for chlorination without first reducing it to the oxide form.

When we refer herein to aluminum sulphate, it will be understood that we include that substance in whatever form it may be used in the process. For instance, it may be used in ores that carry the sulphate in such state that the ores themselves may be put directly into our process; or it may be in ores that require pretreatment of some kind to separate certain other matters; or it may be in ores that may be put directly into the process but that may require one or two additional steps during the process to separate out matters other than the aluminum compound. It will not be necessary, for the purposes of explaining this specific form of our invention, to go into any detail as to how different ores may be handled. It will suffice to explain the process as it is applied simply to aluminum sulphate.

In this process we first usually dehydrate the sulphate. This dehydration may of course be carried on as an integral part of the process; or the process, as actually practiced, may start with dehydrated aluminum sulphate, the sulphate having been previously dehydrated at some other place or time. It is economical however, to dehydrate the aluminum sulphate in the process itself and during the heating that is necessary to chlorinate the sulphate. Thus we place the aluminum sulphate together with a suitable amount of carbon, in any suitable retort, and bring it up to a red heat (say a temperature of about 600° C. or higher) and while at this temperature treat the mixture with a chlorinating agent, as chlorine. During the heating the sulphate is first dehydrated; the water may pass off to atmosphere or may be condensed. The reaction is $$Al_2(SO_4)_3.18H_2O + heat = Al_2(SO_4)_3 + 18H_2O.$$

Then, depending upon the proportion of chlorine and carbon used, the chlorinating reaction will be as follows:

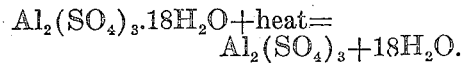
$$Al_2(SO_4)_3 + 8Cl + 10C + heat = Al_2Cl_6 + S_2Cl_2 + SO_2;$$

or—

$$Al_2(SO_4)_3 + 12Cl + 6C = Al_2Cl_6 + 3SO_2Cl_2 + 6CO.$$

In the second instance the CO is separated as a gas, and the other two products may be separated by any suitable procedure of fractional condensation. In the first case the $S_2Cl_2$ may be decomposed to obtain its chlorine or it may be treated with water to obtain HCl from which chlorine may be obtained to be put back into the process.

In the second case also we may, by heat, have another reaction, as follows:

$$SO_2Cl_2 + heat = SO_2 + Cl_2.$$

The $SO_2$ may be separated from the $Cl_2$ by freezing out the $SO_2$ or by absorption of the $SO_2$.

As a result, in either case, we have produced anhydrous aluminum chloride and also have produced $SO_2$ or S and chlorine. The chlorine may of course be put back into the process to treat more sulphate. The $SO_2$ may either be used (as explained more fully in application "D" of this series) to make more sulphate for the process; or it may be used, as explained fully in application "B" and "C" of this series, Serial No. 646,555, filed June 20, 1923, and Serial No. 646,556, filed June 20, 1923, respectively; to make more chlorine to be used in the process. Although there are several manners in which this may be done, it is unnecessary, for the purposes of the present application, to explain all of the variations. It will be sufficient to say, as an illustration, that the $SO_2$ may be combined with O and with $H_2O$ to form $H_2SO_4$; and then hydrochloric acid may be formed by reaction between the $H_2SO_4$ and any suitable chloride; and then by catalytic action hydrochloric acid may be decomposed to yield chlorine.

As an illustration of how the $SO_2$ may be used to produce more sulphate for the process, we may say that the $SO_2$ may be combined with O by catalytic action, and then combined with $H_2O$ to form $H_2SO_4$. This $H_2SO_4$ may then be used to treat any aluminum silicate or aluminum bearing ore suitable for making aluminum sulphate. For instance we may use an ordinary clay of the typical formula:

$$Al_2O_3.3SiO_2.3H_2O$$

and the reaction would then be as follows:

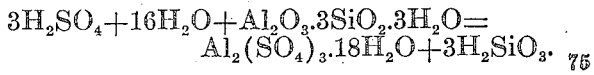
$$3H_2SO_4 + 16H_2O + Al_2O_3.3SiO_2.3H_2O = Al_2(SO_4)_3.18H_2O + 3H_2SiO_3.$$

The carbon for the chlorinating reaction may be supplied in any suitable form. In application "A" of this series we have described how such carbon may be supplied in the form of hydrocarbons; and such supply of carbon may preferably be carried out here. As an illustration, we may impregnate the sulphate with liquid or vaporous hydrocarbons, prior to the chlorinating reaction, and preferably impregnate the sulphate with an excess of hydrocarbons over and above the amount required to merely supply the carbon for the chlorinating reaction. Or, we may introduce hydrocarbon in liquid or vapor form (under the heat maintained in the reaction the hydrocarbons are mostly if not wholly vaporized). In any case, if an excess of hydrocarbons is used, the resulting aluminum chloride is impregnated with hydrocarbon, and in this form is relatively non-deteriorating and highly suitable for use in hydrocarbon distilling or cracking processes.

Having described a preferred form of our invention, we claim:

1. A process that includes dehydrating aluminum sulphate, then chlorinating said sulphate to form anhydrous aluminum chloride.

2. A process that includes dehydrating aluminum sulphate, then chlorinating said sulphate to form anhydrous aluminum chloride and sulphur compounds, and then separating the chloride from the sulphur compounds by fractional condensation.

3. A process that includes chlorinating dehydrated aluminum sulphate to form anhydrous aluminum chloride and a sulphur-chlorine compound, decomposing the sulphur-chlorine compound and using the chlorine as a chlorinating agent for the sulphate.

4. A process that includes dehydrating aluminum sulphate, then chlorinating said sulphate in the presence of carbon to form anhydrous aluminum chloride.

5. A process that includes dehydrating aluminum sulphate, then chlorinating said sulphate in the presence of hydrocarbons to form anhydrous aluminum chloride.

6. A process that includes dehydrating aluminum sulphate, then chlorinating said sulphate in the presence of hydrocarbons to form anhydrous aluminum chloride, the hydrocarbons being used in excess of the amount requisite to supply carbon for the chlorinating reaction so that the resulting chloride is impregnated with hydrocarbons.

7. A process that includes chlorinating dehydrated aluminum sulphate to form anhydrous aluminum chloride and sulphur compounds, and then forming a chlorinating agent by use of the sulphur compounds.

In witness that we claim the foregoing we have hereunto subscribed our names this 7th day of June, 1923.

HENRY I. LEA.
CLIFFORD W. HUMPHREY.

Witnesses as to Humphrey:
M. E. KENNEDY,
F. G. WAGGENER.